Oct. 7, 1958 R. H. GRISWOLD ET AL 2,855,330
METHOD OF APPLYING FILTER COATINGS
Filed Aug. 21, 1956
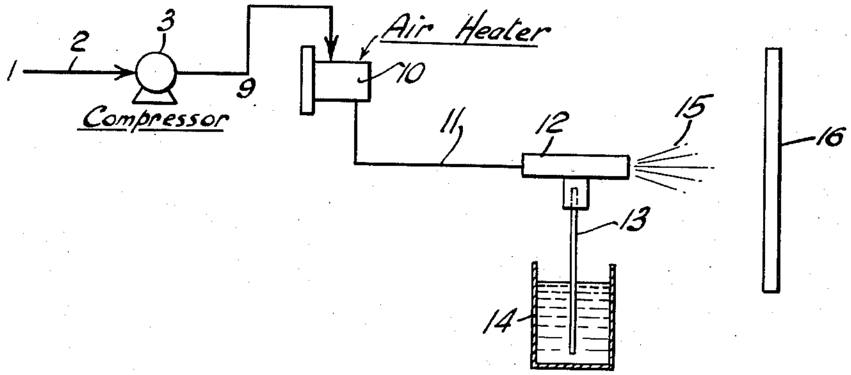

United States Patent Office 2,855,330

Patented Oct. 7, 1958

1

2,855,330

METHOD OF APPLYING FILTER COATINGS

Richard H. Griswold, Chelsea, and Newton P. Randall, Beacon, N. Y., assignors to The Texas Company, New York, N. Y., a corporation of Delaware Application August 21, 1956, Serial No. 605,268

5 Claims. (Cl. 117—99)

This invention relates to a process for applying polyethylene-thickened mineral oil coatings to gas filters.

In accordance with the process of this invention, an air filter coating consisting of polyethylene-containing mineral oil is applied to gas filters by a process involving heating a gas stream to a temperature between 225 and 325° F. and suspending the polyethylene-containing mineral oil in the heated gas stream. The gas stream containing suspended polyethylene-containing mineral oil is brought into contact with the gas filter structure with the result that the polyethylene-mineral oil product penetrates into the pores of the gas filter and is evenly distributed over the surface thereof.

The process of the invention is particularly useful for applying the fluid-type polyethylene-containing lubricating oil composition sold by The Texas Company as Airtac, which is the subject matter of a commonly assigned copending application Serial No. 500,642, filed April 11, 1955, by T. B. Jordan, J. P. Dilworth and R. C. Givens. The polyethylene-containing mineral oil product disclosed in the afore-identified copending application is fluid at temperatures as low as 60° F. whereas other commercially available polyethylene-thickened mineral oils are gelatinous at temperatures below about 150° F. The fluid nature of Airtac permits easier application to the cellular structure of a gas filter and results in the formation of a more efficient gas filter, apparently because of its better wicking, water separation and foaming properties.

The polyethylene-thickened mineral oils to which the invention is applicable comprise 2 and 5 weight percent of polyethylene of average molecular weight between 10,000 and 30,000 and a hydrocarbon base oil having a flash point above about 350° F. The base oil is usually a distillate lubricating oil rather than a residual oil and is preferably of the naphthene type, although paraffin base and mixed paraffin-naphthene base oils are employed.

All of the commercial products of this type, with the exception of Airtac, are sold as gelatinous products, that is they are merchandised in the form in which they appear on the filter. The Texas Company product is the sole material available as a fluid, and it undergoes a phase change in the application procedure and becomes gelatinous after application to the gas filter. The fluid nature of Airtac is attributable to the fact that the average particle size of its polyethylene component is at least 10 microns and usually between 15 and 75 microns. The gelatinous polyethylene-containing filter coatings must be heated to a temperature of about 200° F. for application, whereas the fluid Airtac product can be applied by heating to a temperature substantially below this level, namely about 180° F., prior to application.

Prior to this invention, polyethylene-containing mineral lubricating oil compositions have been applied to gas filters by a variety of methods. In the larger shops, the large filters from diesel engines have been dipped into a vat of hot polyethylene-containing mineral oil, the coated filter removed and placed into a centrifuge for removal of the excess coating. The equipment involved in this method is so costly that its use is precluded except in the large installations, for example railroad shops.

The most common method of applying air filter coatings involves heating polyethylene-containing mineral oil products in a small pot and blowing the coating onto the filter with air using an aspirator-type nozzle. This method has the serious shortcomings of (1) insufficient penetration of the coating into the filter and (2) clogging of the filter due to excessive deposition of the coating on the exterior surface. The process of the subject invention overcomes both of these drawbacks while simultaneously reducing the fire hazard inherent in heating a mineral oil composition in an open pot.

The main inventive feature of the process of this invention resides in the use of a hot gas stream for the dual purpose of raising the polyethylene-containing mineral oil coating to the level necessary for application and of contacting the coating with the gas filter. The use of the gas stream as the heat source had the unexpected result that polyethylene base filter coating penetrates into the pores of the filter and forms a smooth coating on its exterior surface. The resulting filters are as efficient from the standpoint of dirt removal properties as the filter obtained in the large shops by the total immersion-centrifuging process. The attainment of an efficiency of this type without the necessity of costly equipment installation has been a great boon to the smaller shops.

A further advantage of the process of the invention is that the elimination of the need for heating the oil product reduced the fire hazard. The use of the compressed gas as the heat source for raising the filter coating to the desired temperature is a much safer expedient than the previous heating of the polyethylene-containing mineral oil.

A compressed air stream is normally used as the heat carrier in the process of the invention because of its ready availability. Other gases such as nitrogen, carbon dioxide, helium and flue gas may be used as heat carriers but their cost restricts their use except in special circumstances.

It is advantageous that the gas stream be at a pressure above 25 p. s. i. g. to expedite its heating, the entrainment of polyethylene-containing mineral oil and the application of the latter to the gas filter.

The pressure of the gas actually needs only be sufficient to cause a gas flow rate of a magnitude creating a suction for the entrainment of the polyethylene-containing mineral oil. Gas streams at pressures of 30 p. s. i. g., 80 p. s. i. g. and about 100 p. s. i. g. have been used successfully in the process of the invention. A maximum pressure of 200 p. s. i. g. is prescribed to permit ease of control of the application rate. Plant compressed air usually available at pressures between 30 and 120 p. s. i. g. is conveniently used in the process of the invention. Flow rates between 5 and 30 cubic feet per minute of gas are used in the process of the invention. Suspension of substantial quantities of polyethylene-containing mineral oil in the gas stream requires air rates above about 5 cubic feet per minute. At air rates between about 5 and 30 cubic feet per minute smooth application of the suspension to the gas filter is obtained. At an air rate above 30 cubic feet per minute, it is difficult to control the application of the polyethylene-containing mineral oil to the gas filter. It will be understood that there is definite correlation between the air flow rate and the temperature of the gas stream and as a general proposition, it can be stated that the air rate will vary inversely within the prescribed limits with the temperature of the gas stream.

The gas stream is heated to a temperature above 225° F. in order to impart sufficient heat to the filter coating for it to be applied to the gas filter in sufficiently fluent form for good penetration into the pores thereof. With The Texas Company's fluid-type polyethylene-mineral oil filter coating, a gas temperature of 225 to about 275° F. is sufficient for obtaining the necessary heat level in the coating for its application to the foraminous structure. With the gelatinous-type polyethylene-containing lubricating compositions, it is necessary to heat the gas to a level between 275 and 325° F. to effect suspension in the gas stream and application to the filter structure. The upper temperature limit of 325° F. is primarily imposed by safety considerations.

The gas stream may be heated to the desired level by any of the customary methods of heat exchange. It has been found convenient to use an electrical immersion heater inserted in the pipe through the conduit through which the gas stream flows. A 1000 watt, 110 volt heater inserted into a 1½" pipe, through which plant air at about 75 p. s. i. g. was flowing, proved very satisfactory.

Suspension of the polyethylene-mineral oil filter coating in the heated air stream is most conveniently effected by means of an aspirator. Other means of suspending a filter coating in the air may also be used, for example, direct passage of the hot gas stream through the polyethylene-containing mineral oil disposed in shallow pans. The gel-type polyethylene-mineral oil filter coatings are preheated to a temperature of about 110 to 140° F. prior to their suspension by means of an aspirator.

The suspended coating is readily blown on the gas filter with a gun-type aspirating nozzle. Other impingement devices may be used where the suspension of the filter coating in the gas stream is effected by means other than aspiration. For example, the filter coating can be pumped under pressure and suspended in the hot gas stream by an atomizing nozzle. The source of pressure may also be the compressed air, applied to a closed vessel containing the filter coating material.

The process of the invention is illustrated in the accompanying schematic drawing. Air is obtained from a source 1 through a pipe 2 and raised to a pressure above about 25 p. s. i. g in compressor 3. The gas stream is then introduced into an electric immersion heater 10 through a pipe 9. The heated gas exits from the immersion heater 10 at a flow rate of about 15 cubic feet per minute through a pipe 11 and passes into a T gun 12. One arm 13 of the T gun is immersed in a vessel 14 containing a supply of the polyethylene-containing mineral oil which is aspirated into the gas stream. The gas stream containing suspended polyethylene-containing mineral oil issues from the aspirating nozzle 15 and impinges upon the gas filter 16. The polyethylene-mineral oil penetrates into the pores of the gas filter and is evenly distributed over the faces of the gas filter 16. The polyethylene-mineral oil becomes a gelatinous coating on the interior and exterior surfaces as the filter cools subsequent to the application by the process of the invention.

The process of the invention is illustrated in the following example:

*Example*

Plant air at 80 p. s. i. g. was heated to approximately 250° F. by a 1000 watt 110 volt heater inserted into a 1½" pipe through which the air stream was flowing. The heated air flowing at about 16 C. F. M. per minute was conducted through a small diameter flexible hose and was passed through a T gun, which was in aspirating relationship with a pail of Airtac, comprising 97.5 weight percent naphthene base distillate oil having an SUS at 100° F. of about 312 and 2.5 weight percent polyethylene of average molecular weight about 23,000. The Airtac product was fluid and was characterized by the fact that the polyethylene particles had an average particle size of 15–75 microns. The suspension of Airtac in the gas stream was blown on an air filter 20 x 20 x 4 inches thick, packed with metallic shavings similar to coarse steel wool, an American Filter Company Type OC–H air intake filter used in a Cooper-Bessemer compressor. Penetration through the full 4" thickness of the filter was obtained without clogging the filter. Inspection indicated that excellent removal of dirt was being obtained during use of the filter in the compressor.

The experiment was repeated with a different type filter, namely, a Farr-type filter packed with crimped wire screen and having similar dimensions, mainly 20 x 20 x 4 inches thick. With this filter, the filter coating penetrated better than half way through the thickness in the form of a clear firm gel.

Obviously, many modifications and variations of the invention, as hereinbefore set forth, may be made without departing from the spirit and scope thereof and, therefore, only such limitations should be imposed as are indicated in the appended claims.

We claim:

1. In the formation of a gas filter, a process for spraying a mineral lubricating oil containing 2–5 weight percent polyethylene having an average molecular weight between 10,000 and 30,000 onto a gas filter which comprises heating a gas selected from the group consisting of air, nitrogen, carbon dioxide, helium and flue gas to a temperature between 225 and 325° F., contacting said heated gas with said polyethylene-containing lubricating oil, said lubricating oil prior to contact with said gas being at a temperature below 140° F., suspending said polyethylene-containing lubricating oil in said gas and contacting said gas with said gas filter whereby said polyethylene-containing lubricating oil penetrates into the pores of said gas filter and is evenly distributed over the surface thereof.

2. A process according to claim 1 in which said gas is at a pressure between 25 and 200 p. s. i. g. and is flowing at a rate between 5 and 30 cubic feet per minute.

3. A process according to claim 1 in which said gas is air at a pressure between 30 and 120 p. s. i. g.

4. In the formation of a gas filter, a process for spraying a fluild polyethylene-containing lubricant comprising 97.5 weight percent of a naphthene base distillate oil and 2.5 weight percent of polyethylene having an average molecular weight of 23,000 and an average particle size of between about 15 and 75 microns, which comprises heating an air stream to a temperature between 225 and 275° F., contacting said heated air stream with said polyethylene-containing lubricant, said lubricant being at ambient temperature prior to said contact, suspending said polyethylene-containing lubricant in said air stream by aspiration and contacting the lubricant-containing air stream with said gas filter whereby said polyethylene-containing lubricant penetrates into the pores of said gas filter and is distributed evenly over the surface thereof.

5. A process according to claim 4 in which said air stream is at a pressure between 25 and 200 p. s. i. g. and is flowing at a rate between 5 and 30 cubic feet per minute.

References Cited in the file of this patent

UNITED STATES PATENTS

| | | |
|---|---|---|
| 773,714 | Coster | Nov. 1, 1904 |
| 1,998,100 | Shepherd et al. | Apr. 16, 1935 |
| 2,062,090 | Gaarder et al. | Nov. 24, 1936 |
| 2,355,225 | MacWilliam | Aug. 8, 1944 |
| 2,627,938 | Frohmader et al. | Feb. 10, 1953 |